US008746590B1

(12) United States Patent
Collins

(10) Patent No.: US 8,746,590 B1
(45) **Date of Patent: *Jun. 10, 2014**

(54) RISER ASSEMBLY FOR USE WITH FLUID SPRINKLER

(76) Inventor: Wade E. Collins, Arco, ID (US)

( * ) Notice: Subject to any disclaimer, the term of this patent is extended or adjusted under 35 U.S.C. 154(b) by 757 days.

This patent is subject to a terminal disclaimer.

(21) Appl. No.: 12/903,186

(22) Filed: Oct. 12, 2010

Related U.S. Application Data

(63) Continuation-in-part of application No. 11/983,273, filed on Nov. 8, 2007, now Pat. No. 7,832,659.

(51) Int. Cl.
*A01G 27/00* (2006.01)
*A01G 25/06* (2006.01)
*B05B 15/06* (2006.01)

(52) U.S. Cl.
USPC .............................. 239/201; 239/69; 239/285

(58) Field of Classification Search
USPC ........... 239/63, 64, 65, 67, 68, 69, 70, 71, 72, 239/73, 74, 200, 201, 202, 203, 204, 205, 239/206, 285
See application file for complete search history.

(56) References Cited

U.S. PATENT DOCUMENTS 3,439,895 A 4/1969 Marandi
4,014,359 A * 3/1977 Sanner ......................... 137/78.2
4,193,543 A 3/1980 Viesturs et al.
4,669,663 A 6/1987 Meyer
4,883,228 A 11/1989 Vydrzal et al.
5,011,081 A 4/1991 Bentley
5,133,501 A 7/1992 Marshall
6,050,500 A 4/2000 Ensworth
6,135,362 A 10/2000 Purdy
6,234,411 B1 5/2001 Walker et al.
6,491,235 B1 12/2002 Scott et al.
6,568,608 B2 5/2003 Sirkin
6,808,127 B2 10/2004 McNulty et al.
6,874,696 B1 4/2005 Ericksen et al.
7,121,478 B1 10/2006 Jones
7,832,659 B1 * 11/2010 Collins ......................... 239/201

* cited by examiner

*Primary Examiner* — Ryan Reis
(74) *Attorney, Agent, or Firm* — TraskBritt

(57) ABSTRACT

Described is a riser assembly for use with a fluid dispenser, such as a sprinkler. The assembly includes a container partially circumscribing a reservoir configured to contain a pressurized fluid, the container having a fluid inlet and a fluid outlet disposed therethrough. The assembly further includes a signal processor situatable outside the container that is configured to receive a signal. The signal processor is operatively connectable to a control valve that is operatively connectable to the fluid dispenser. The control valve is configured to selectively control expulsion of the fluid through the fluid dispenser in response to the signal received by the signal processor.

20 Claims, 14 Drawing Sheets

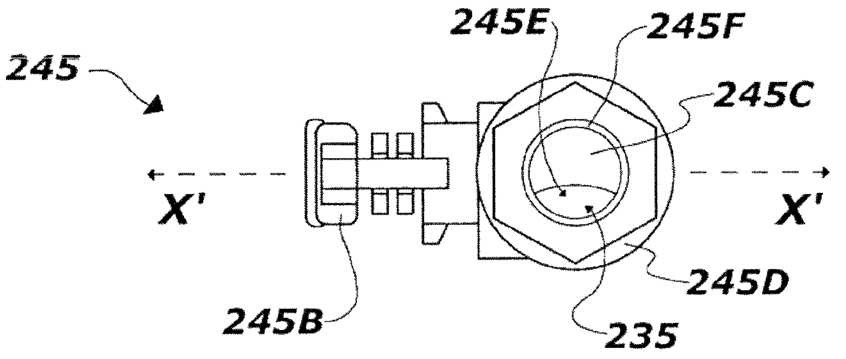
FIG. 12
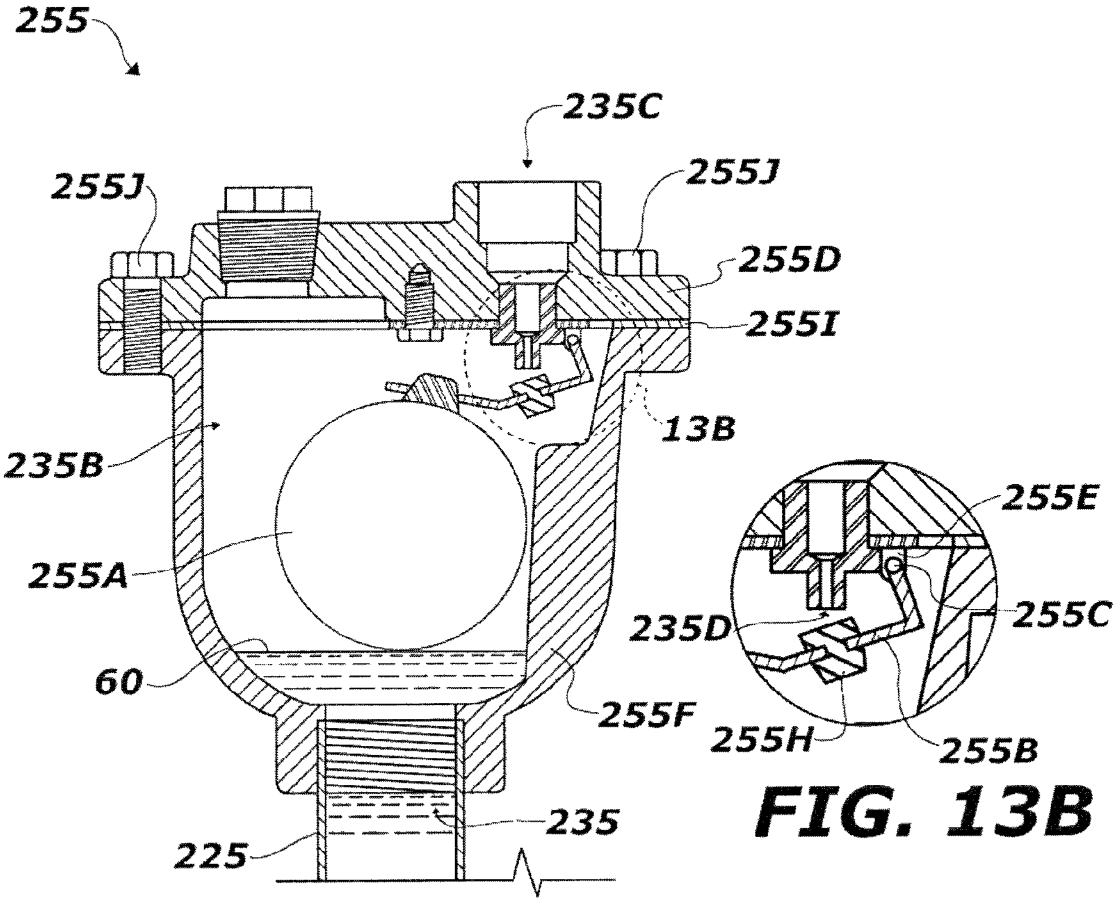
FIG. 13B
FIG. 13A

RISER ASSEMBLY FOR USE WITH FLUID SPRINKLER

PRIORITY/CROSS-REFERENCE TO RELATED APPLICATIONS

This application is a continuation-in-part application of application Ser. No. 11/983,273, filed Nov. 8, 2007, entitled "Riser Assembly for Use with Fluid Sprinkler," now U.S. Pat. No. 7,832,659, issued Nov. 16, 2010, the disclosure of which is hereby incorporated herein in its entirety by this reference.

FIELD OF THE INVENTION

The riser assembly generally relates to a riser assembly for use with a fluid dispenser. More specifically, the assembly relates to an adjustably-weighted riser assembly for use with a fluid-dispensing sprinkler.

BACKGROUND OF THE INVENTION

Processes for conveying fluid from a pressurized fluid source through a fluid-dispensing sprinkler are known. In a typical practice, fluid pressurized by a pump is conveyed from a supply pipe through a riser assembly and expelled through a sprinkler. Various means for controlling expulsion of fluid through a sprinkler have been utilized. These means for controlling fluid expulsion include associating a control valve with the sprinkler, associating a control valve with the riser assembly or associating a control valve with an intermediate connector between the riser assembly and the sprinkler. A wire or other signal carrier may convey a signal to a signal processor that then processes the signal and influences movement of the control valve to control fluid expelled.

The installation, maintenance, removal, and transport of a conventional riser assembly can present a number of challenges. Particularly in the case of riser assemblies used with high-output directional sprinklers, a first set of challenges arises from the fact that expulsion of fluid through the sprinkler can exert significant and potentially-destabilizing forces upon the riser assembly. This challenge is compounded where such forces may be exerted from varying angular or lateral directions as, for example, in the case of a riser assembly used with a powerful rotary sprinkler.

Another set of challenges arises from temperature variations, precipitation and other environmental conditions encountered in the often-rugged outdoor settings where a riser assembly is used. These environmental conditions can pose a challenge not only to the riser assembly itself but additionally to functional elements operatively connectable with the riser assembly and, particularly, to wires and other signal carriers, signal processors, and control valves.

Past approaches to address the foregoing challenges have been proposed. One such approach involves the burial of all or most of the riser assembly in soil or other ground material. In addition to burial of the riser assembly in the ground, approaches for stabilizing a riser assembly include encasement of the riser assembly within a concrete pier or the attachment of the riser assembly to materials that either are not removable or are not easily removable without damaging the riser assembly. Such attempts to stabilize riser assemblies have typically resulted in assemblies that are: (1) complicated, difficult, expensive, and time consuming to install and maintain, and (2) complicated, difficult, expensive, or even impossible to remove, transport, and reinstall. For example, installation of such conventional risers often requires digging, drilling, cutting, grinding, beveling, welding, screwing, gluing, tarring, and pouring concrete. This often requires the use of numerous man hours and varying types of tools and pieces of equipment. Where conventional risers are secured using poured concrete, in particular, the concrete often needs to be allowed to solidify before the riser can be utilized, and breaking apart the concrete to try to remove the conventional riser can lead to damage to the riser itself.

SUMMARY OF THE INVENTION

The present riser assembly is usable with even high-output, directional sprinklers and facilitates rapid, efficient, yet sturdy and easily-modifiable connection of the riser assembly to a pressurized fluid source. Installation of embodiments of the present riser assembly does not require a concrete pier or even burial of a majority of the riser assembly in the ground. Further, embodiments of the present, adjustably-weighted riser assembly can be easily and efficiently installed, maintained, removed, and reinstalled with minimal use of tools and without damage to the riser assembly and any associated signal carrier, signal processor, or means for controlling expulsion of fluid through the sprinkler.

The present riser assembly also provides a reservoir configured to contain a pressurized fluid, which container is at least partially circumscribed by a container. A signal processor is included and is situatable outside of the container. The signal processor is operatively connectable to means for selectively controlling expulsion of fluid through the sprinkler, such as a control valve, in response to a signal received by the signal processor.

In some embodiments, the present riser assembly includes a conduit circumscribing a channel occupiable by a signal carrier, the conduit having a fluid-excluding intermediate portion passing through the reservoir. When the reservoir contains pressurized fluid, the conduit also passes through the pressurized fluid. In such conduit-including embodiments, the riser assembly thus allows for disposal of a signal carrier through a fluid-excluding and insulated channel to carry a signal from outside the container through the channel to the signal processor. The channel is accordingly insulated from elements outside the container not only by the conduit and container but also by the pressurized fluid within the reservoir.

Because the riser assembly contains a reservoir configured to contain pressurized fluid, it is rendered comparatively heavier and more stable during times of use when the reservoir is filled with fluid and comparatively lighter during the assembly's installation, removal, and transport when the reservoir is devoid of fluid. Adjustments to the amount of pressurized fluid contained within the reservoir therefore adjusts the weight of the riser assembly itself.

Among other uses, the assembly has particular utility in the livestock feeding context where many animals are enclosed in close proximity for feeding prior to their sale at market. Feedlot irrigation systems often include a main water supply line connected to a system of subterranean supply lines and a plurality of risers, each riser being connectable to the water supply line. A sprinkler head operatively connects to the riser to dispense water over a desired area. This feedlot irrigation leads to minimization of airborne dust, which could otherwise produce nose, respiratory, skin, and eye problems. Feed lot irrigation also facilitates bacterial and disease control and can assist in reducing the mortality rate and damage to livestock prior to sale. Feed lot irrigation moderates ground temperature and thereby reduces stress upon livestock.

The present riser assembly is configured for use with a fluid dispenser, particularly a sprinkler. In a preferred embodiment, the riser assembly includes a container partially circumscribing a reservoir configured to contain pressurized fluid, the container having a fluid inlet and a fluid outlet disposed therethrough; and a cover connectable to the container, the cover having an aperture configured to contain or receive a sprinkler supply line disposed therethrough, a cavity being formed between the cover and the container. In some embodiments, the assembly further includes a conduit circumscribing a channel occupiable by a signal carrier, the conduit having a fluid-excluding intermediate portion disposed within the reservoir, a first conduit portion disposed through the container to a signal carrier entry area outside the container, and a second conduit portion disposed through the container to a signal carrier exit area.

The riser assembly facilitates rapid, efficient, sturdy, and easily-modifiable connection of the riser assembly to a pressurized fluid source and the stable use thereof. without need of a concrete pier, permanent anchor, or the burial of a majority of the riser assembly in the ground. Therefore the number of tools and pieces of equipment required for installation is minimized as is installation time and removal time, should removal be desired.

The present riser assembly is selectively, adjustably weighted so as to be (1) heavier and more stable during operation and the expulsion of fluid from the assembly through an operatively connected fluid dispenser and (2) lighter during installation, removal, and transport of the riser assembly.

In some embodiments of the assembly, an insulated channel is provided that contains a signal carrier that is insulated not only by a conduit contained within a container but also by a reservoir fillable with pressurized fluid.

The present riser assembly is preferably configured to be used with a fluid dispenser that is a high-output, directional sprinkler. It is also preferably configured to be easily and efficiently installed, maintained, removed, and reinstalled, with minimal use of additional tools and without damage to the riser assembly or any associated signal carrier, associated signal processor, or associated means for controlling expulsion of fluid through the sprinkler. The minimal number of component parts of the assembly further provides for stable, easy, and simple installation, use, and removal. The riser assembly is also preferably of a comparatively-simple construction, is economically feasible, durable, and relatively free of trouble in use and operation. According to a preferred embodiment, the assembly is comprised largely of high density polyethylene such that parts within the riser assembly and connections made to the riser assembly may be fused to one another so as to minimize the risk of leaks. The HDPE composition further minimizes the risk of cracking due to extreme environmental conditions, reduces the likelihood of electric shock to an installer or other person or animal that should come in contact with the riser, and allows for relatively-easy attachment of other HDPE fittings by fusing the same to the present riser.

The purpose of the Summary is to enable the public, and especially the scientists, engineers, and practitioners in the art who are not familiar with patent or legal terms or phraseology to determine quickly, from a cursory inspection, the nature and essence of the technical disclosure of the application. The Summary is neither intended to define the invention of the application, which is measured by the claims, nor is it intended to be limiting as to the scope of the invention in any way.

Still other features and advantages of the claimed assembly will become readily apparent to those skilled in the art from the following detailed description describing preferred embodiments of the assembly, simply by way of illustration of the best mode contemplated by carrying out the assembly. As will be realized, the assembly is capable of modification in various obvious respects all without departing from the invention. Accordingly, the drawings and description of the preferred embodiments are to be regarded as illustrative, and not restrictive.

BRIEF DESCRIPTION OF THE DRAWINGS

FIG. 12 is a bottom plan view of a second ball valve subassembly noted as item 245 in FIG. 9.

FIG. 13A is a sectional view of item 255 and an upper portion of item 245 taken through line 13-13 of FIG. 9.

FIG. 13B is an enlarged illustration of segment 13B of FIG. 13A:

DESCRIPTION OF THE PREFERRED EMBODIMENTS

Figure 1:
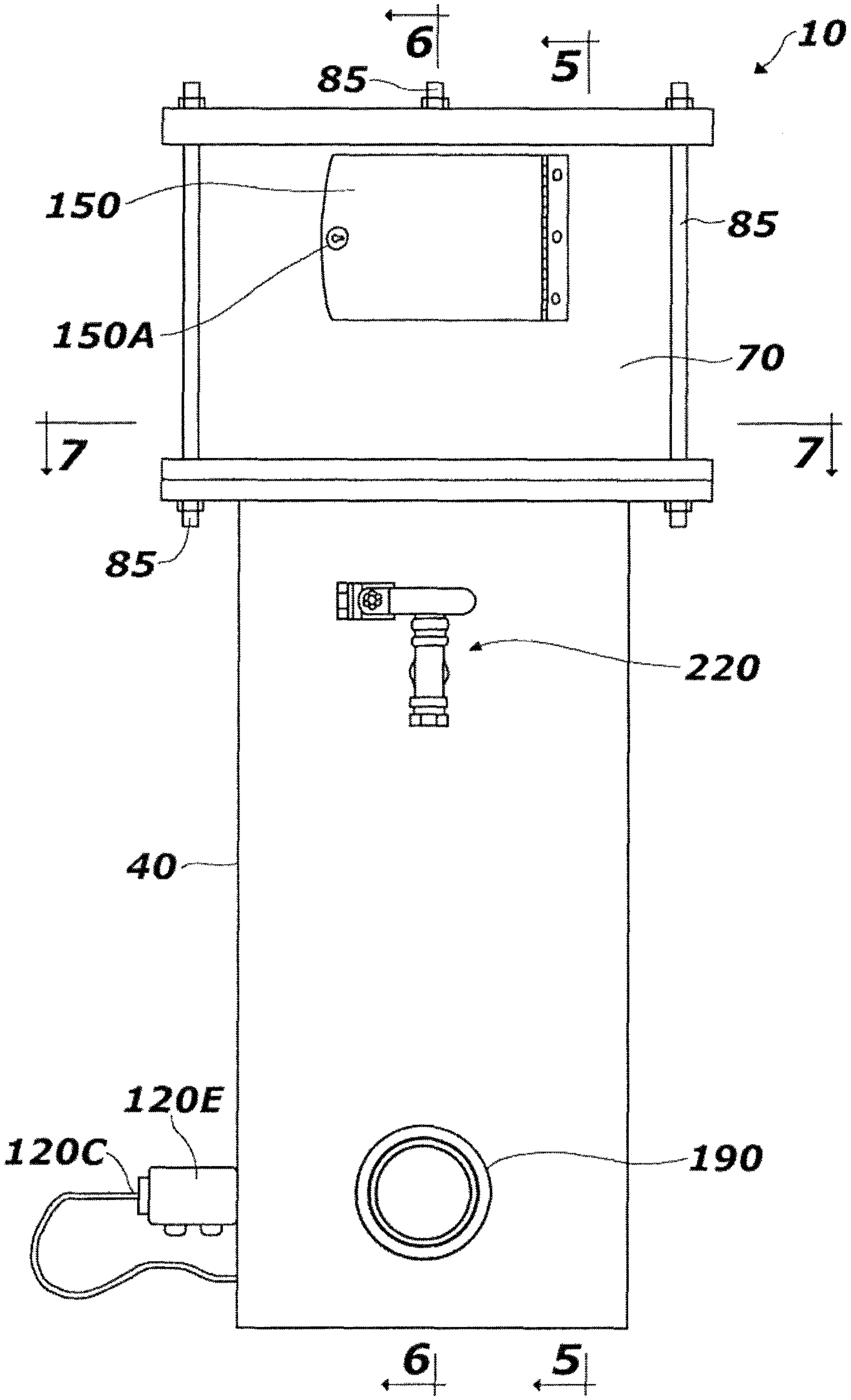
FIG. 1 is an elevated front plan view of an embodiment of a riser assembly.

While the assembly is susceptible of various modifications and alternative constructions, certain illustrated embodiments thereof have been shown in the drawings and will be described below in detail. It should be understood, however, that there is no intention to limit the invention to the specific form disclosed, but, on the contrary, the assembly is to cover all modifications, alternative constructions, and equivalents falling within the spirit and scope of the invention as defined in the claims.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

Figure 2:
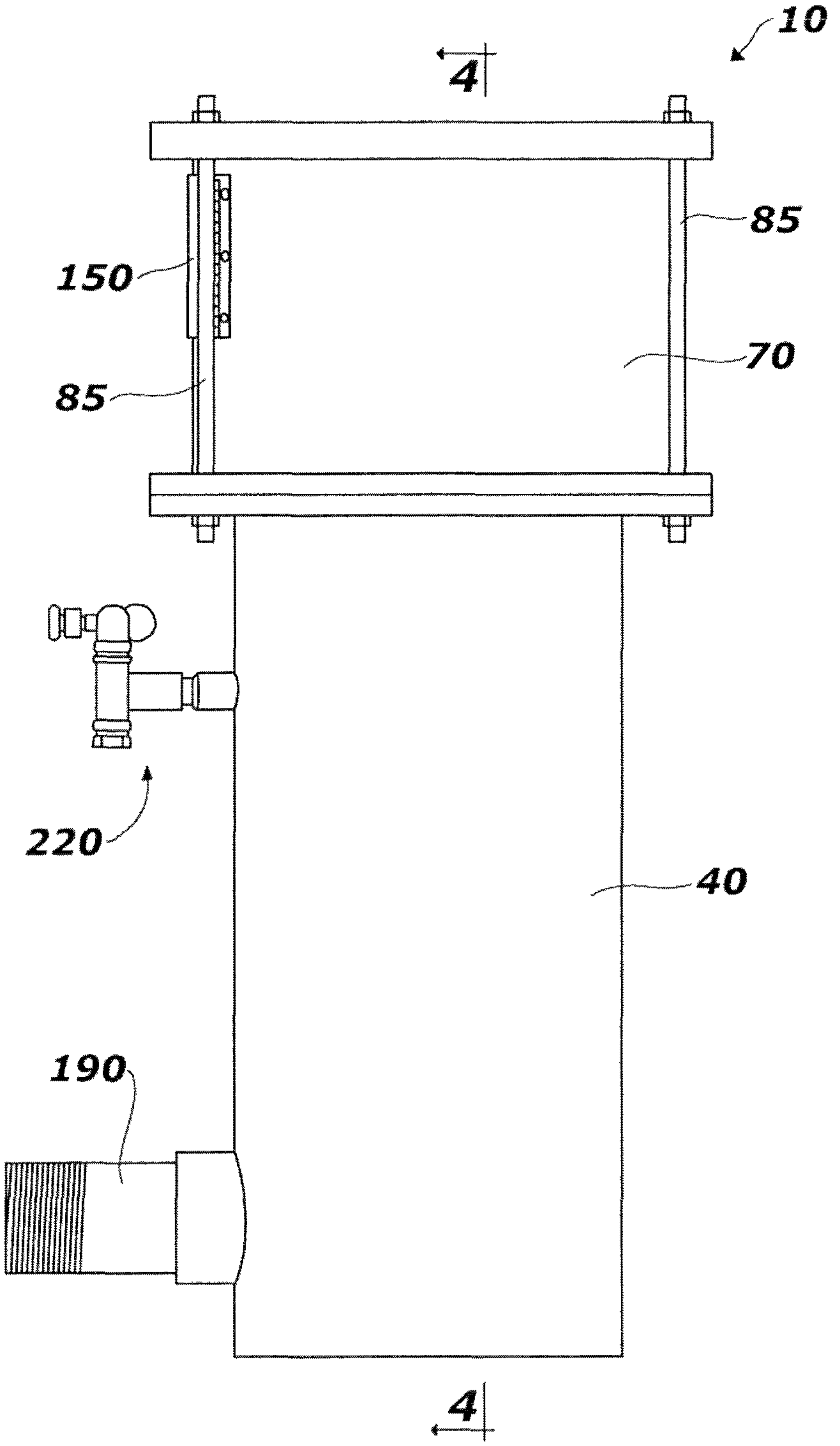
FIG. 2 is a first elevated side plan view of an embodiment of a riser assembly.
Figure 3:
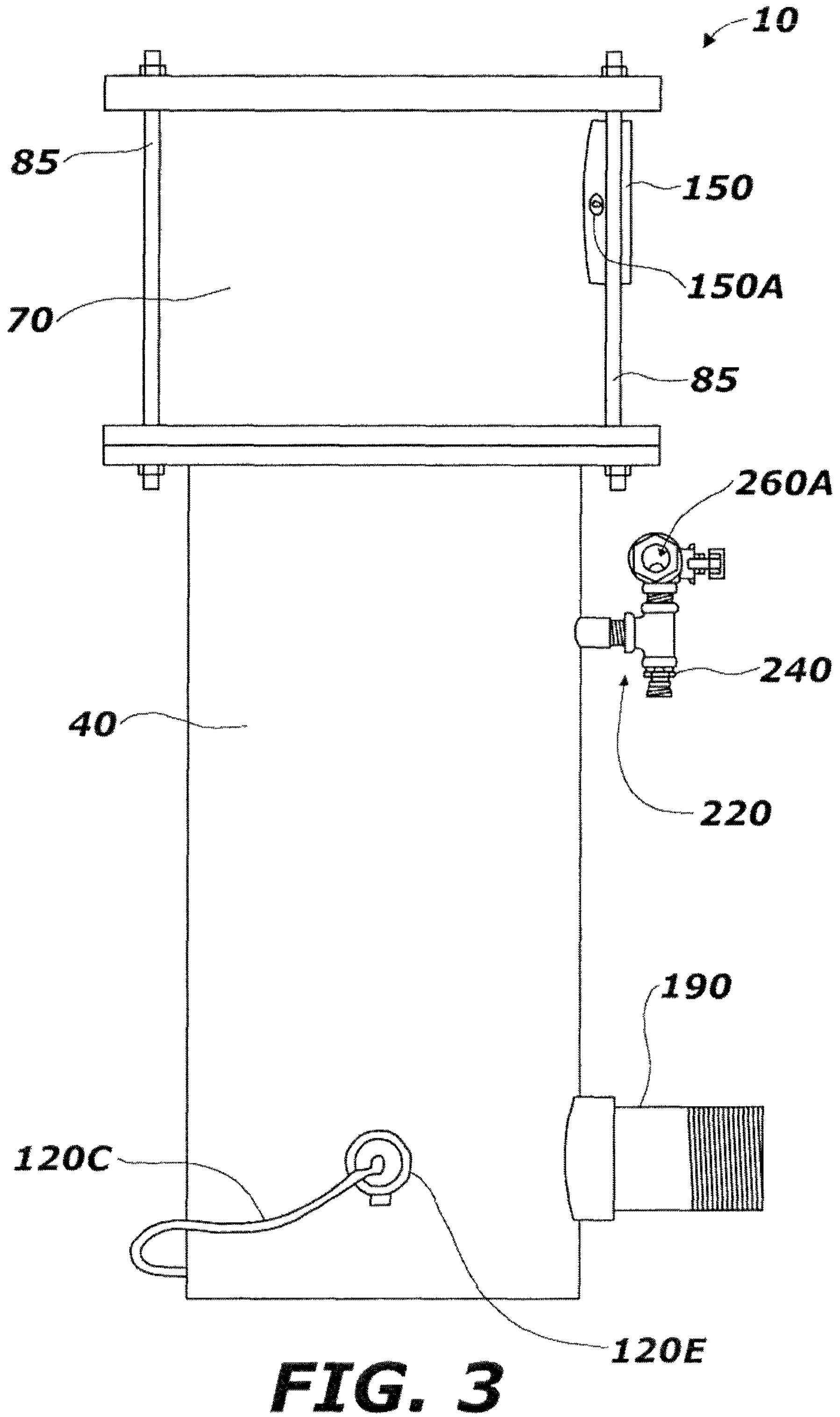
FIG. 3 is a second elevated side plan view of an embodiment of a riser assembly.
Figure 8:
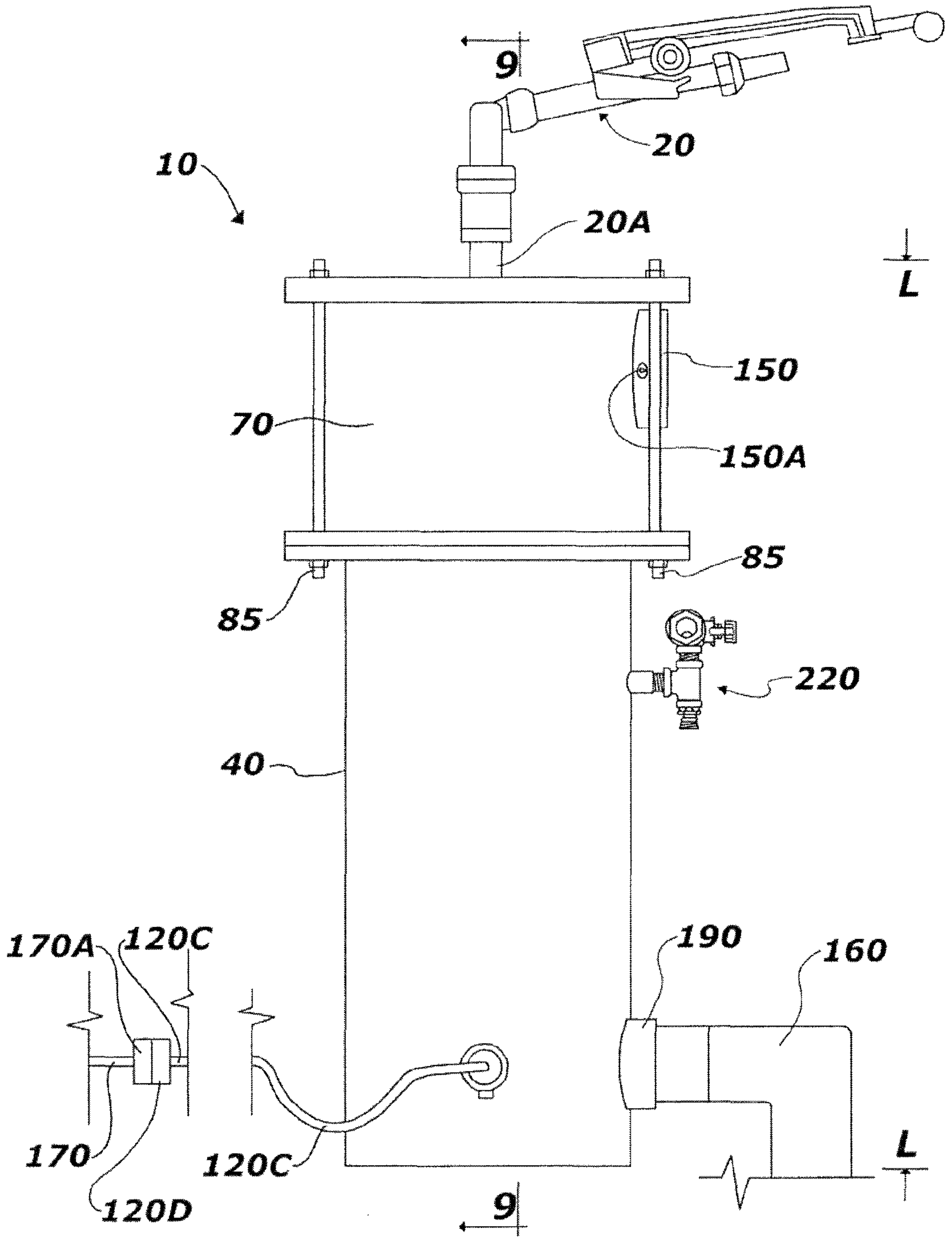
FIG. 8 is an elevated, side plan view of an embodiment of the riser assembly shown in operative connection with a fluid dispenser, the fluid dispenser being a sprinkler with associated control valve configured to selectively control expulsion of fluid through the sprinkler.

FIGS. 1 through 3 illustrate a preferred embodiment of a riser assembly 10. The riser assembly 10 is designed for use with a fluid dispenser, the fluid dispenser being preferably a sprinkler illustrated generally as item 20 in FIG. 8 and, particularly, a sprinkler for spraying pressurized fluids with an associated control valve 30 (FIG. 9) configured to selectively control fluid expulsion through the sprinkler 20.

With attention directed principally to FIGS. 1 through 7, it is seen that a preferred embodiment of the riser assembly 10 includes: (1) a container 40 having a side wall 40A, a top 40B, and a bottom 40C, the container 40 partially circumscribing a reservoir 50 (FIGS. 4, 5, 6, and 9) for containing a pressurized fluid 60, the container 40 having a fluid inlet 40D and a fluid outlet 40E (FIG. 6) disposed therethrough; and (2) a cover 70 connectable by a plurality of fasteners 85 to the top 40B of the container 40, the cover 70 having an aperture 80 (FIG. 6) for containing a sprinkler supply line 20A (FIGS. 8 and 9) disposed therethrough, a cavity 90 (FIGS. 4, 5, 6, and 9) being preferably formed between the cover 70 and the container 40. According to the depicted embodiment, the riser assembly 10 further includes a conduit 100 (FIGS. 4, 5, 6, and 9) circumscribing a channel 110 (FIGS. 6 and 7) occupiable by a signal carrier 120 (FIGS. 6 and 7), the signal carrier 120 being most preferably a plurality of wires or a cable for conveying an electronic signal. An intermediate conduit portion 100A of the conduit 100 is disposed within the reservoir 50 and is constructed to exclude fluid 60 within the reservoir 50 from the channel 110.

With attention directed primarily to FIGS. 4, 5, 6, and 9 it is further seen that in a preferred embodiment of the riser assembly 10: (1) A first conduit portion 100B operatively connects to the intermediate conduit portion 100A and is disposed through the container 40 to a signal carrier entry area 120A outside the container 40; (2) a second conduit portion 100C operatively connects to the intermediate conduit portion 100A and is disposed through the container 40 to a signal carrier exit area 120B outside the container 40 and, preferably, within the cavity 90; and (3) the signal carrier 120 (FIGS. 6 and 7) may accordingly be disposed through the channel 110 (FIG. 6) circumscribed by the conduit 100 to carry a signal from outside the container 40 through the channel 110 to a signal processor 130 (FIG. 9) situatable within the cavity 90, the signal processor 130 being operatively connectable to a control valve 30 configured to selectively control expulsion of fluid 60 through the sprinkler 20 in response to a signal received through the signal carrier 120. In some configurations, the control valve 30 is operatively connectable to a solenoid 30A and a pressure regulator 30B. Also in some configurations, a second signal carrier coupler 120F (FIG. 9) is detachably connected to the remainder of the signal carrier 120 and adapted for connection to the signal processor 130.

According to another embodiment of the riser assembly 10, a signal is wirelessly carried to the signal processor 130 (FIG. 9) situatable outside of the container 40. According to the preferred configuration of such embodiments, no first conduit portion 100B, intermediate conduit portion 100A, or second conduit portion 100C pass through the reservoir 50.

An embodiment of the riser assembly 10 is adapted for use with and operative connection to (1) a control valve 30, an example of which is identified as a "pilot operated valve" as disclosed in U.S. Pat. No. 3,439,895, the patent and items disclosed therein being incorporated herein by this reference, and (2) a sprinkler, an example of which is identified as the "sprinkler head" disclosed in U.S. Pat. No. 4,669,663 and U.S. Pat. No. 4,193,543, the patents and items disclosed therein being incorporated herein by this reference. It is to be appreciated though that embodiments of the riser assembly 10 may be configured for use with alternate sprinklers, control valves, and/or signal processors that function to selectively control expulsion of pressurized fluid 60 from the reservoir 50 of the present assembly 10 through an operatively-attachable sprinkler 20 in response to a signal received by the signal processor 130. It is further to be appreciated that the assembly 10 may be configured to allow for operative connection to a fluid pressure regulator 30B (FIG. 9) allowing a human operator to monitor fluid pressure.

In a preferred embodiment, the container 40 and the conduit 100 are (1) composed of electrically-resistant, high density polyethylene capable of withstanding at least 200 pounds of pressure per square inch and connections between (1) the top 40B, the side wall 40A and the bottom 40C and (2) the container 40 and conduit 100 are formed by electro-fusion treatment to create a fluid-tight seal for containing a fluid 60 pressurized at up to 200 pounds per square inch. Alternatively, the container 40 can be formed by injection molding to provide an integral piece of high density polyethylene capable of withstanding at least 200 pounds of fluid pressure per square inch.

With further attention directed principally to FIGS. 1 through 7, it is seen that, in a preferred embodiment of the riser assembly 10 the cover 70 (1) connects by a plurality of fasteners 85 to the top 40B of the container 40, (2) has an aperture 80 (FIG. 6) configured to contain a sprinkler supply line 20A (FIG. 9) disposed therethrough, (3) facilitates formation of a protective cavity 90 between the cover 70 and the top 40B of the container 40, and (4) may have disposed therethrough an opening 140 (FIG. 4) coverable by a door 150 with a lock 150A selectively openable by a human operator to facilitate such operator's selective access to the cavity 90 and items contained therein. In a preferred embodiment, the lock 150A selectively secures the door 150 to the cover 70.

With attention directed primarily to FIGS. 4, 5, 6, and 9, it is further seen that in a preferred embodiment (1) a first conduit portion 100B operatively connects to the intermediate conduit portion 100A and is disposed through the container 40 to a signal carrier entry area 120A outside the container 40; (2) a second conduit portion 100C is operatively connected to the intermediate conduit portion 100A and is disposed through the container 40 to a signal carrier exit area 120B outside the container 40 and, preferably, within the cavity 90; and (3) the signal carrier 120 may accordingly be disposed through the channel 110 (FIGS. 6 and 7) circumscribed by the conduit 100 to carry a signal, most preferably being an electronic signal (not shown), from outside the container 40 through the channel 110 to a signal processor 130 protected within the cavity 90, the signal processor 130 being operatively connected to means for selectively controlling expulsion of fluid 60 through the sprinkler 20 in response to a signal received through the signal carrier 120. For example, according to the depicted embodiment, the signal processor 130 is operatively connected to a control valve 30 configured to selectively control expulsion of fluid 60 through a sprinkler 20 in response to a signal received through the signal carrier 120. Further, in a preferred embodiment, the first conduit portion 100B is disposed through a first extrusion 40F (FIG. 4), the first extrusion 40F extending outwardly away from an outer surface 400 of the container 40 and the second conduit portion 100C is disposed through a second extrusion 40H (FIG. 4), the second extrusion 40H extending upwardly away from an upper surface 401 of the container 40.

With attention directed principally to FIGS. 4, 5, 6, and 9, it is seen that, in a preferred embodiment of the assembly 10, (1) the fluid inlet 40D (FIG. 6) is disposed though a side wall 40A of the container 40, (2) the fluid outlet 40E (FIG. 6) is disposed though a top 40B of the container 40, (3) the fluid inlet 40D is proximate an end of a fluid intake passageway 180, the fluid intake passageway being contained by a fluid intake pipe 190, (4) the fluid outlet 40E is proximate an additional end of a fluid outlet passageway 200, the fluid outlet passageway being partially circumscribed by a fluid outlet pipe 210, and (5) a secondary fluid outlet 220A is disposed through the container 40. The secondary fluid outlet 220A is preferably disposed into a secondary fluid outlet subassembly 220 (FIGS. 1, 3, and 11), the secondary fluid outlet subassembly 220 preferably including a secondary control valve configured to selectively control flow of pressurized fluid from the reservoir 50 through the secondary fluid outlet 220A and through a pressurized fluid release hole 200A. In some embodiments, the secondary control valve includes a ball valve subassembly 230 disposed between the secondary fluid outlet 220A (FIG. 6) and a pressurized fluid release hole 260A (FIGS. 3 and 11), (2) a fluid drain valve 240 (FIGS. 3 and 11) and (3) a connection pipe 220C.

Figure 10:
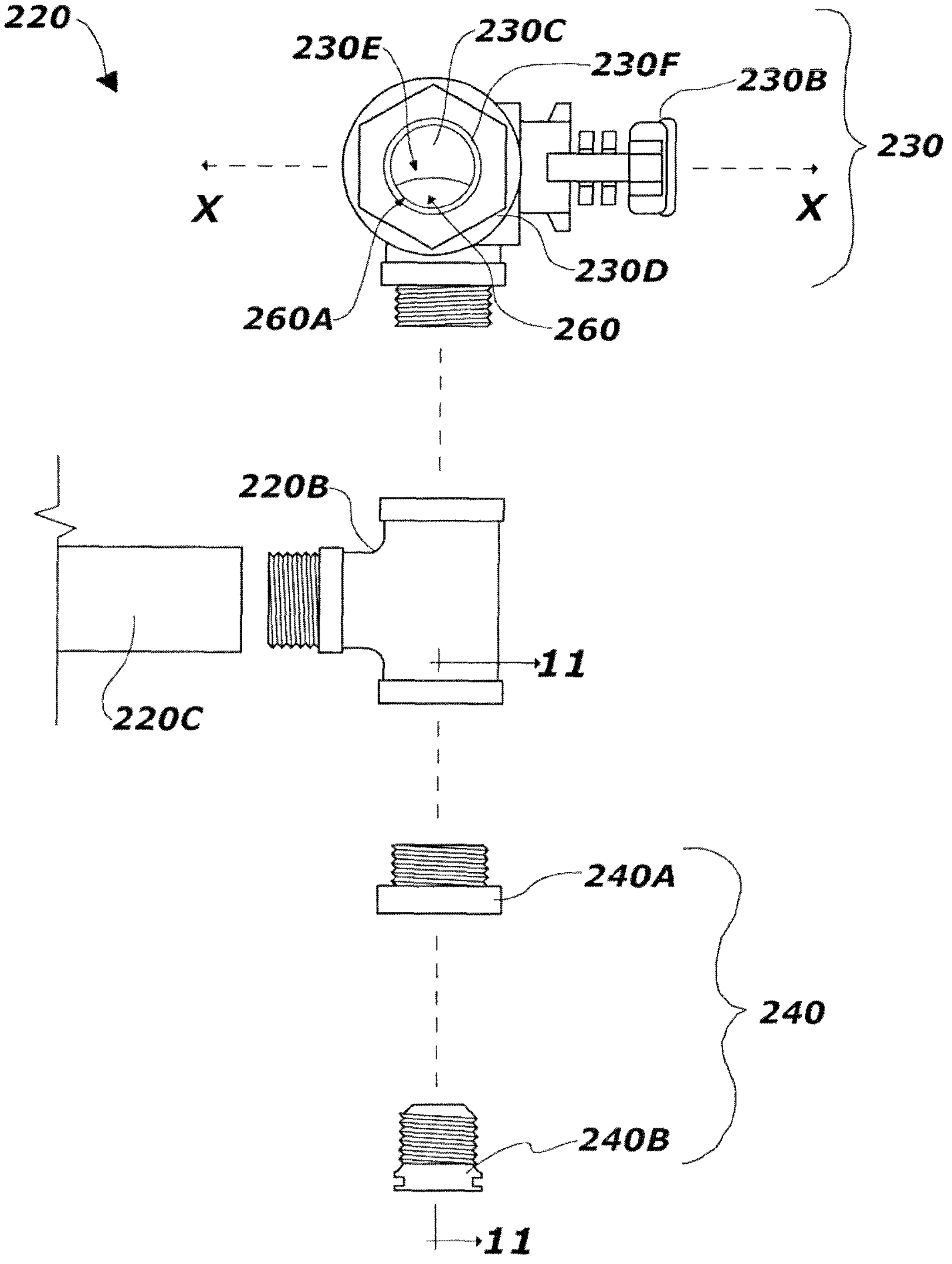
FIG. 10 is a partially-exploded view of a secondary fluid outlet subassembly noted as item 220 in FIG. 3.

As principally seen in FIG. 10, the ball valve subassembly 230 preferably includes a lever 230B operatively connected to a ball 230C, the ball 230C being snugly encased within a gasket 230F in a housing 230D, the ball 230C having a ball aperture 230E disposed therethrough. In a preferred embodiment shown, the ball aperture 230E is selectively movable between (1) a closed position wherein the ball aperture 230E is perpendicular to a fluid expulsion channel 260 and (2) an open position wherein the ball aperture 230E is aligned to form part of the fluid expulsion channel 260 by an operator applying force to the lever 230B and thereby partially rotating the ball 230C within the housing 230D around an axis illustrated generally as X in FIG. 10. The ball valve subassembly 230 enables the operator to selectively open and close the fluid expulsion channel 260 by applying pressure to the lever 230B and to thereby selectively expel pressurized fluid 60 from the reservoir 50. In a preferred embodiment (a) an end of the ball valve subassembly 230 is threaded to allow for rapid detachable operative connection of the ball valve subassembly 230 to a correspondingly threaded branch member 220B; and (b) the branch member 220B is further threaded to allow for the branch member's rapid detachable operative connection by rotational insertion to the container 40 proximate the secondary fluid outlet 220A. It is, however, to be appreciated that alternative means for attaching the secondary fluid outlet subassembly 220 to the container 40 at the secondary fluid outlet 220A may also be used.

Figure 6:
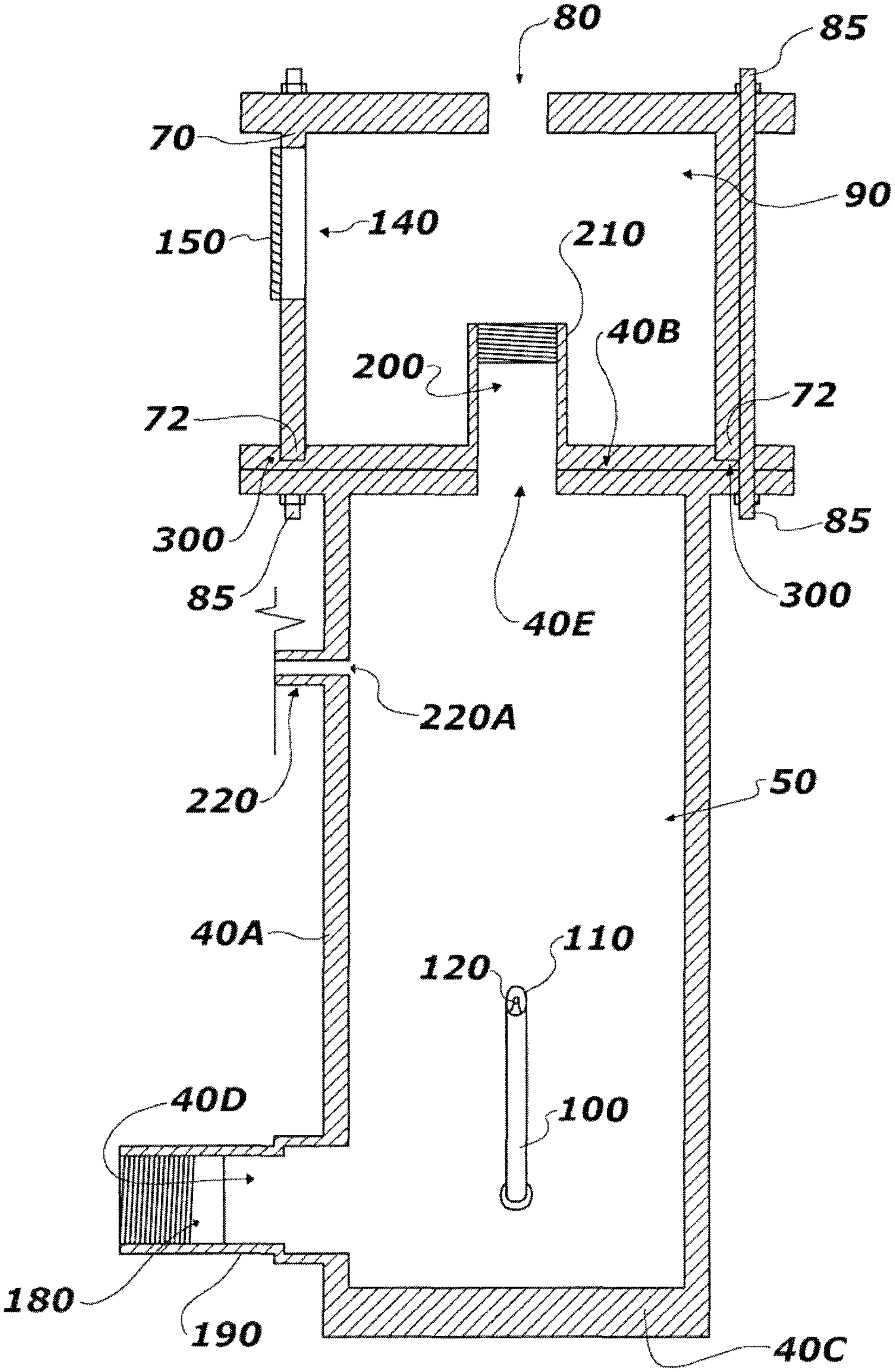
FIG. 6 is a partial, sectional view taken through line 6-6 of FIG. 1.
Figure 11:
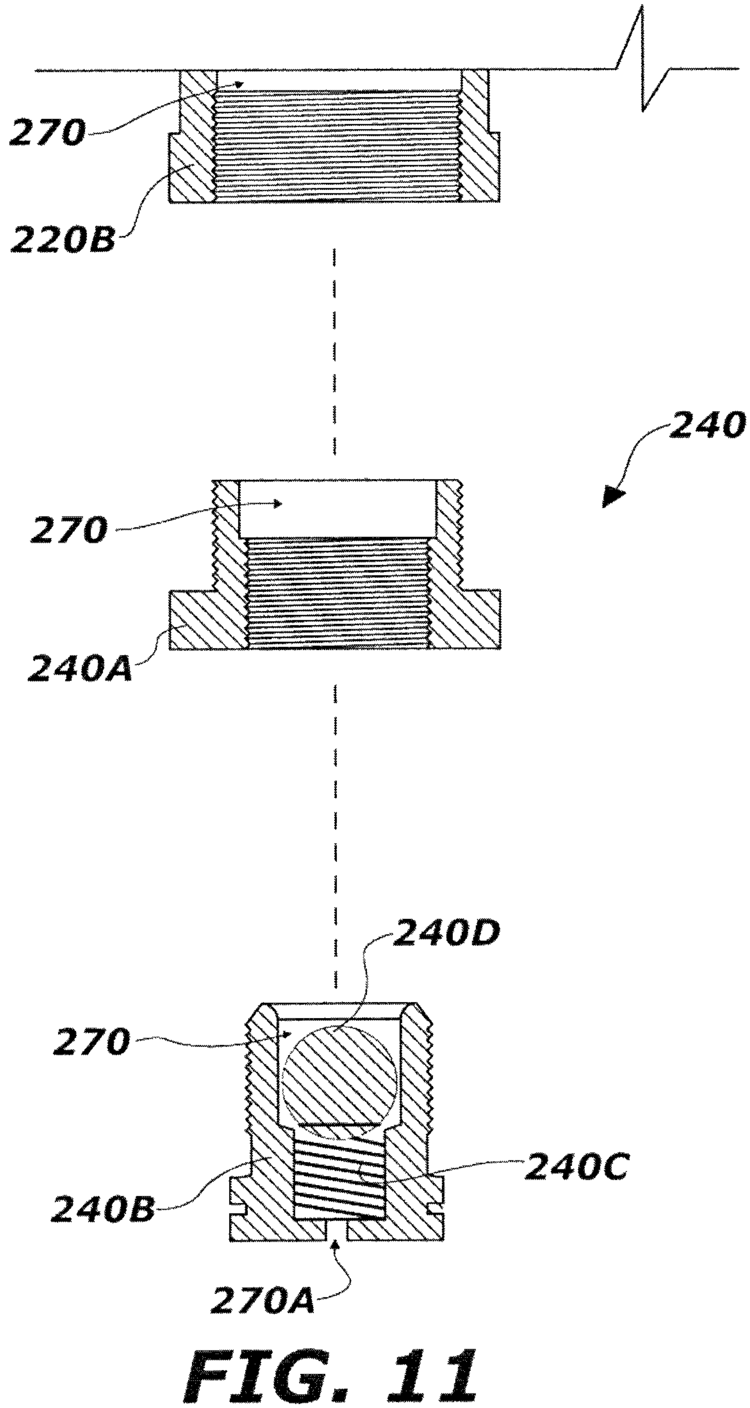
FIG. 11 is a partial sectional view of the secondary fluid outlet subassembly taken through line 11-11 of FIG. 10.
Figure 14:
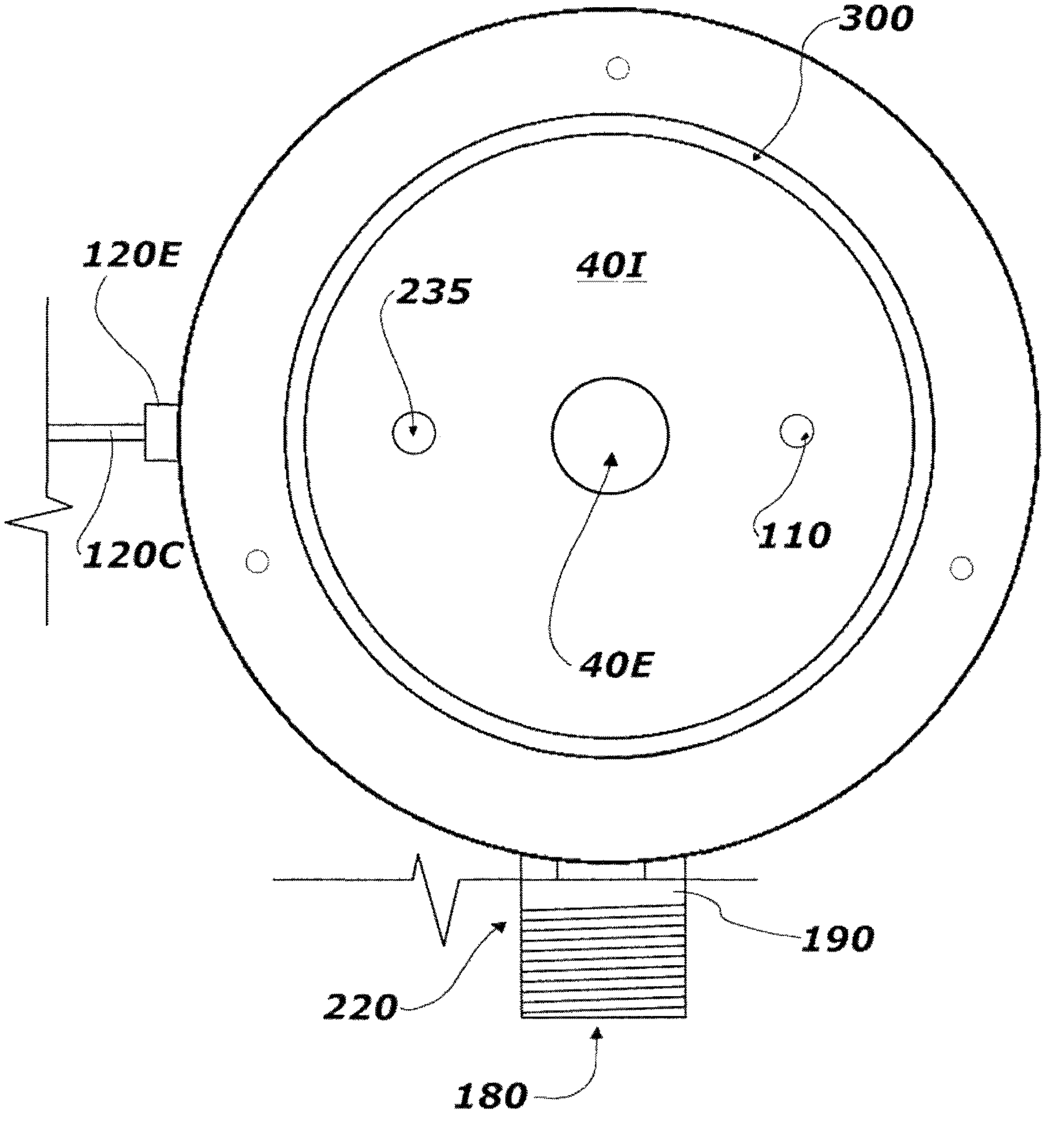
FIG. 14 is a top plan view of a container of an embodiment of a riser assembly, without a cover in place.

As principally seen in FIGS. 6, 10, and 11, the secondary fluid outlet subassembly 220 preferably also includes a fluid drain valve 240 functioning to allow automatic draining of fluid 60 from the reservoir 50 through a drain hole 270A after use of the riser assembly 10 when the fluid 60 within the reservoir 50 is no longer pressurized. The fluid drain valve 240 preferably includes (1) a first threaded insert member 240A rotatably insertable into the branch member 220B, the first threaded insert member 240A having a first portion of a fluid drain passageway 270 disposed there through; (2) a second threaded insert member 240B rotatably insertable into the first threaded member 240A and having a second portion of the fluid drain passageway 270 disposed therethrough, the second insert member 240B circumscribing a second portion of the fluid drain passageway 270, the fluid drain passageway 270 being continuously disposed from the secondary fluid outlet 220A through the container 40 to the drain hole 270A; and (3) a spring 240C with a stopper 240D operatively connected thereto, the spring 240C holding the stopper within the second insert member 240B in a spaced relationship to the drain hole 270A such that (a) as pressurized fluid moves through the fluid drain passageway 270 toward the drain hole 270A, the stopper 240D is forced toward the drain hole 270A and connects the second insert member 240B closing the fluid drain passageway 270 and (b) as pressure is removed from fluid within the fluid drain passageway 270, the stopper 240D is forced by the spring 240C away from the drain hole 270A thereby opening the fluid drain passageway 270 and allowing fluid 60 to exit from the container 40 through the fluid drain passageway 270 and out of the drain hole 270A.

Figure 4:
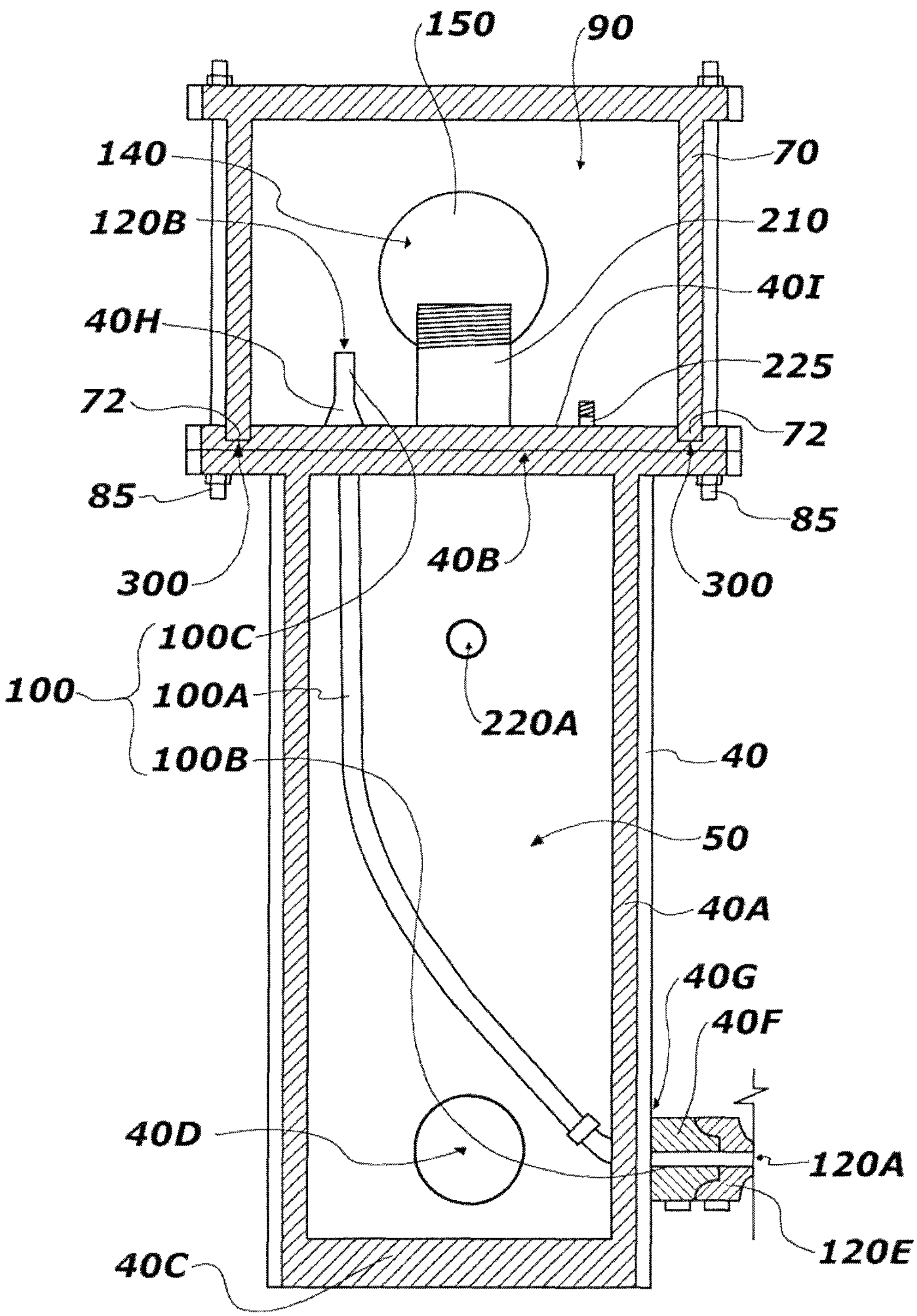
FIG. 4 is a partial, sectional view taken through line 4-4 of FIG. 2.
Figure 5:
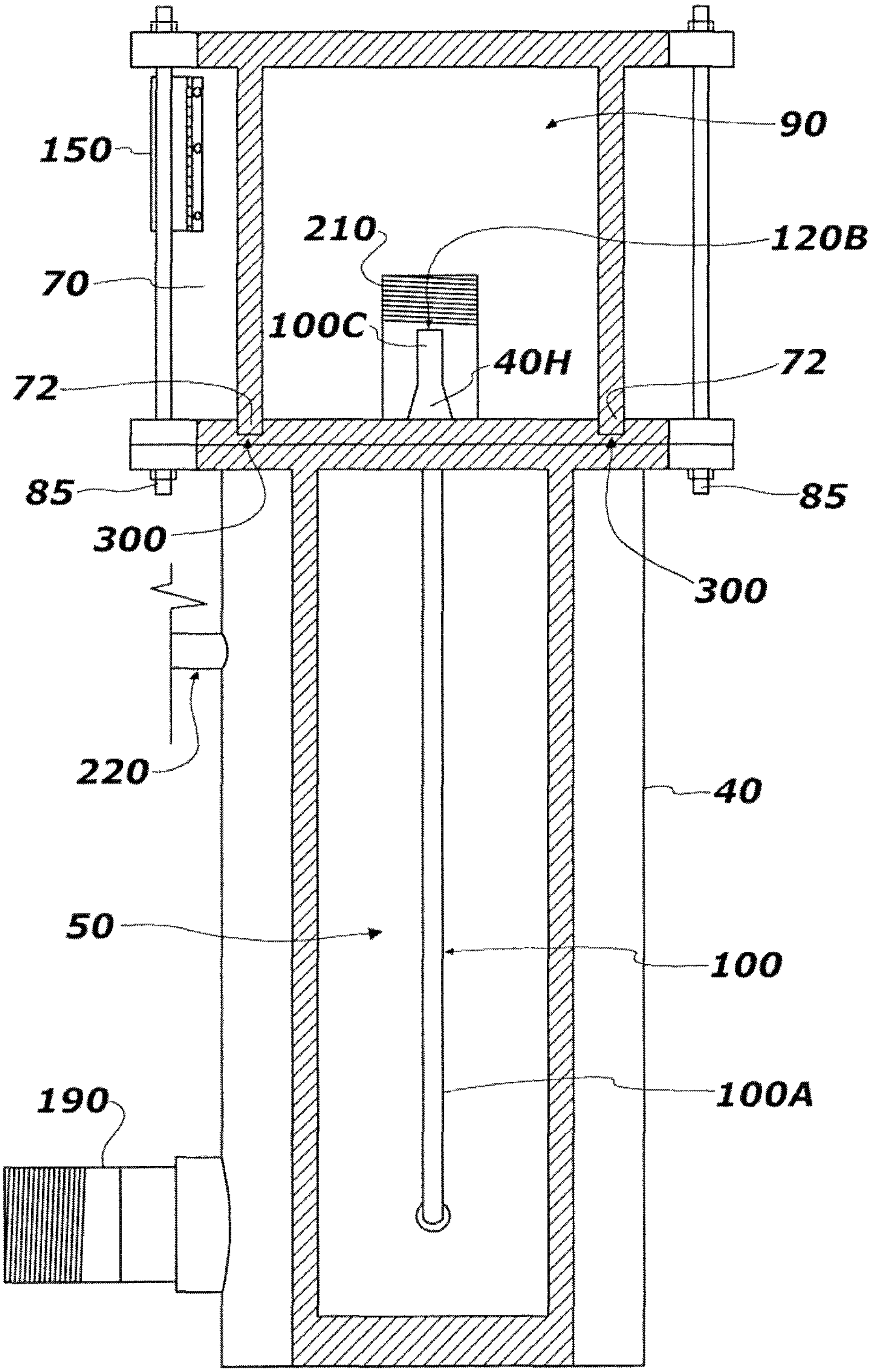
FIG. 5 is a partial, sectional view taken through line 5-5 of FIG. 1.
Figure 7:
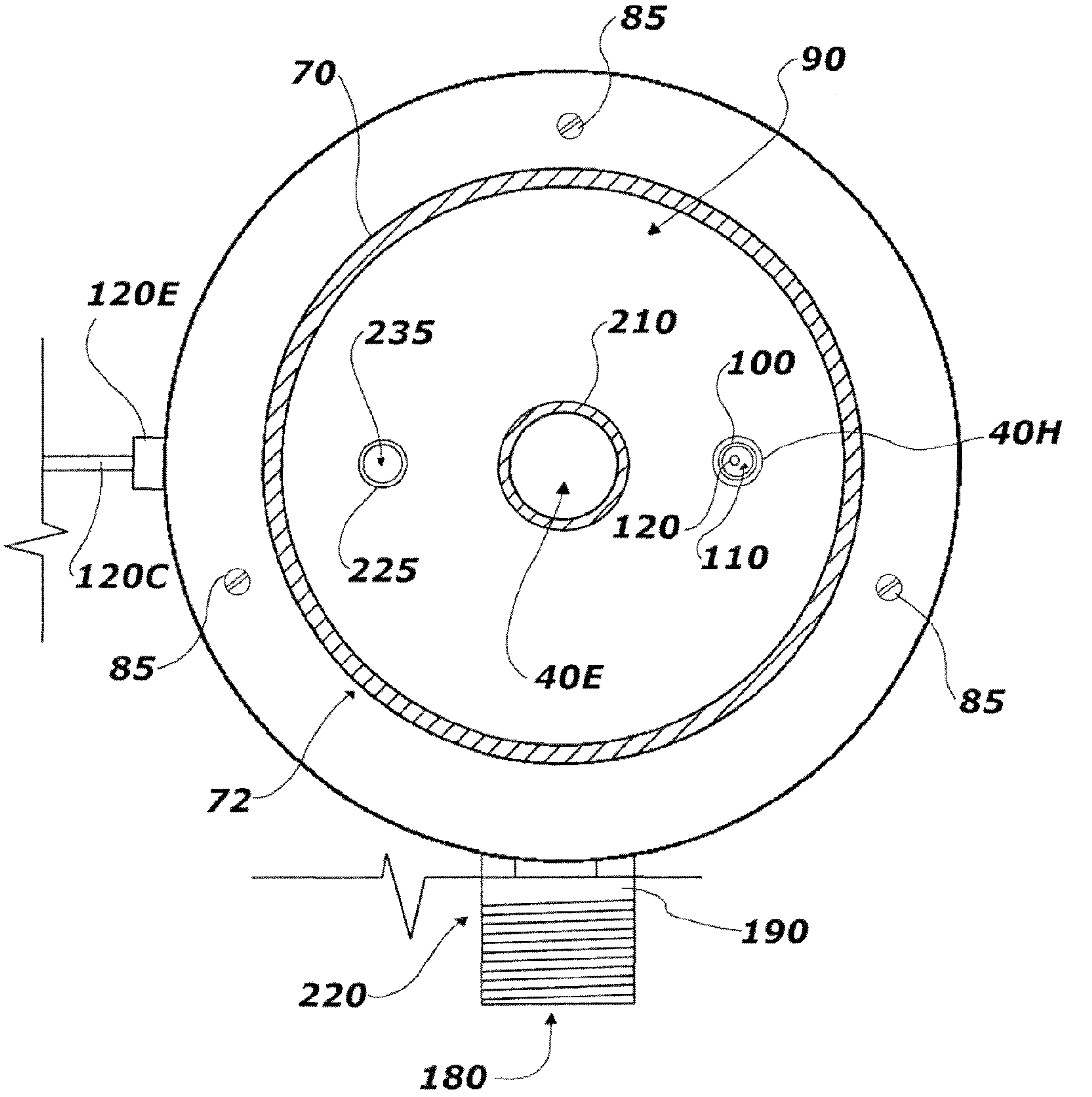
FIG. 7 is a partial, sectional view taken through line 7-7 of FIG. 1.
Figure 9:
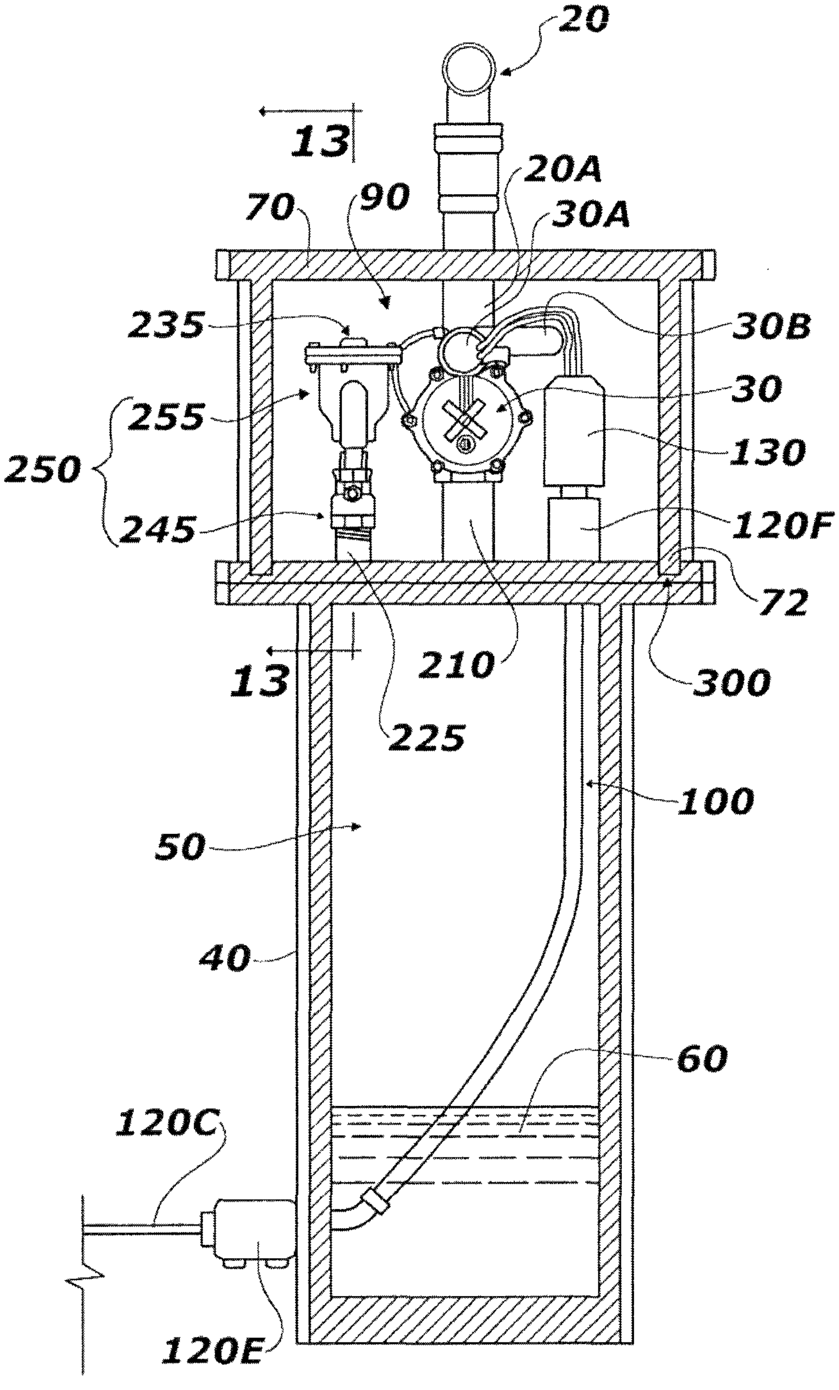
FIG. 9 is a sectional view taken through line 9-9 of FIG. 8 shown with a reservoir of the riser assembly being partially filled with fluid.

With attention directed principally to FIGS. 4, 7, and 9, it is seen that the riser assembly 10 preferably includes an air pipe 225 having an air passageway 235 disposed therethrough, the air passageway 235 being disposed through the container 40. The air pipe 225 functions to (1) release air from the reservoir 50 through the air passageway 235 when fluid 60 is initially introduced under pressure into the reservoir 50 displacing air initially contained within the reservoir 50 and (2) allow air to re-enter the reservoir 50 when fluid 60 is drained from the riser assembly 10 after use. In a preferred embodiment shown, the air pipe 225 is adapted for rapid, stable operative connection to means for selectively controlling release of air through the air pipe 225, a preferred such means for controlling release of air preferably including an air release valve subassembly 250 having (1) a second ball valve subassembly 245 (FIG. 12) and (2) an air drain valve 5 subassembly 255 (FIGS. 13A and 13B).

Referring principally to FIG. 12, the second ball valve subassembly 245 preferably includes a second lever 245B operatively connected to a second ball 245C, the second ball 245C being snugly encased within a second gasket 245F in a second housing 245D and having a second ball aperture 245E disposed therethrough. The second ball aperture 245E is selectively movable between (1) a closed position wherein the second ball aperture 245E is perpendicular to the air passageway 235 and (2) an open position wherein the second ball aperture 245E is aligned to form a part of the air passageway 235 by an operator applying force to a second lever 245B and thereby partially rotating the second ball 245C within the second housing 245D around an axis illustrated generally as X' in FIG. 12.

Referring principally to FIGS. 13A and 13B, air drain valve subassembly 255 preferably includes a float 255A pivotally connected by a float arm 255B to a float pivot pin 255C, the float pivot pin 255C being operatively connected to an air drain valve cover 255D by a bracket 255E. The float 255A is disposed within an air passage corridor 235B circumscribed by a drain valve body 255F and an air drain valve cover 255D, the air drain valve cover 255D having an air drain hole 235C disposed therethrough and being operatively connected to a connection gasket 255I and to the drain valve body 255F by drain valve body fasteners 255J. In standard operation, displaced air travels from the reservoir 50 through the air passageway 235 and the air passage corridor 235B when fluid 60 is initially introduced under pressure into the reservoir 50. When the fluid 60 reaches the float 255A, the float 255A floats upwardly around the float's pivotal connection with the pivot float pin 255C. As the float 255A floats upwardly, a float stop 255H preferably attached to the float arm 255B is moved upwardly to cover an orifice 235D at an end of the air drain hole 235C and thus prevents expulsion of pressurized liquid through the air drain hole 235C. After use of the assembly 10, pressure is withdrawn from the fluid 60, and fluid 60 within the air passage corridor 235B recedes causing the float 255A and pivot float pin 255C to move downward and thereby unstop the orifice 235D and allow air to re-enter the air passage corridor 235B through the orifice 235D.

Although the air pipe 225 is adapted for rapid, stable operative connection to means for controlling release of air through the air pipe 225 and a preferred such means for controlling release of air includes an air release valve subassembly 250 having (1) a second ball valve subassembly 245 having and (2) an air drain valve subassembly 255, it is to be appreciated that the air pipe may alternatively be adapted for connection to alternative structures that function to control release of air from the reservoir 50 through the air passageway 235 and to automatically close such passageway 235 to prevent escape of fluid 60 when such air passageway 235 fills with pressurized fluid 60.

In standard operation, the riser assembly 10 functions to provide a pressurized fluid reservoir 50 and a stable, sturdy yet adjustably-weighted support base for a selectively-controlled fluid dispenser—the dispenser being preferably a directional sprinkler 20 operatively connected to a signal processor 130 and a control valve 30—in a single, connected configuration that is rapidly, conveniently, efficiently, and detachably connectable to (1) a pressurized fluid source 160, the fluid source being preferably a subterranean pipe attached to a pump, and (2) a signal source 170, the signal source being most preferably a signal-carrying wire, cable, or other relay, operatively connected, whether via a wire or wirelessly, to a signal sender. In a preferred embodiment, the configuration of the riser assembly 10 and the reservoir 50 and the weight of the pressurized fluid 60 within the reservoir 50 facilitate stable operation of a rotary sprinkler 20 dispensing fluid pressurized at up to 200 pounds per square inch without need for extensive excavation, concrete thrust blocks or other permanent anchors by simply placing the riser assembly 10 in a comparatively-shallow hole in the ground, the shallow hole being preferably less than one half the depth of the greatest longitudinal dimension L (FIG. 8) of the riser assembly 10 and using sand, soil, and other natural fill material located proximate the shallow hole as backfill after the riser assembly 10 is placed in the hole.

The structure of a preferred embodiment of the riser assembly 10 also functions to allow for disposition of a signal carrier 120 from outside the container 40 through the channel 110 circumscribed by the conduit 100 to carry a signal through the channel 110 to a signal processor 130 situated within the cavity 90, the signal processor 130 being operatively connected to means for selectively controlling expulsion of fluid 60 through the sprinkler 20 in response to a signal received through the signal carrier 120. According to the depicted embodiment, such means includes a control valve 30. The channel 110 is accordingly insulated and protected not only by the conduit 100 and container 40 but also during standard operation of the riser assembly 10 by the pressurized fluid 60 within the reservoir 50. Moreover, the signal carrier 120 in a preferred embodiment is operatively connectable through a detachable cord 120C to a connection plug 120D (FIG. 8) and may thus be easily, rapidly, efficiently, and detachably connected to a corresponding signal source outlet 170A for receiving a signal from a signal source 170 without need of additional tools. In a preferred embodiment, the cord 120C may be detachably connected to a remainder of the signal carrier 120 through a first detachable signal carrier coupler 120E.

The structure of a preferred embodiment of the riser assembly 10 further functions to facilitate alignment, configuration, protection, and support of a signal processor 130, a sprinkler 20, a control valve 30 for selectively controlling expulsion of pressurized fluid 60 through the sprinkler 20 and an air release valve subassembly 250 in operative combination and to provide an adjustably-weighted riser assembly 10 containing a reservoir 50 for containing pressurized fluid 60 that rapidly and easily forms sturdy, operative connections with such sprinkler 20, control valve 30, and air release valve subassembly 250. With particular attention to FIGS. 4, 5, 6, 9, and 14, according to a preferred embodiment of the present riser assembly 10, the cover 70 includes a lower cover edge 72 and the upper container surface 401 of the container 40 has, defined therein, a groove 300. The groove 300 is configured to snugly receive therein the lower cover edge 72 of the cover 70. As such, in assembling the riser assembly 10, inserting the lower cover edge 72 into the groove 300 positions the cover 70 in appropriate position relative to the container 40. This therefore properly aligns the aperture 80 (FIG. 6) in the cover 70 with the fluid outlet 40E extending from the container 40. This, consequently, places the sprinkler 20 and sprinkler supply line 20A (FIG. 9) in proper alignment with the fluid outlet pipe 210. Preferably, the alignment is accomplished without the need for additional bracing.

Figure 15:
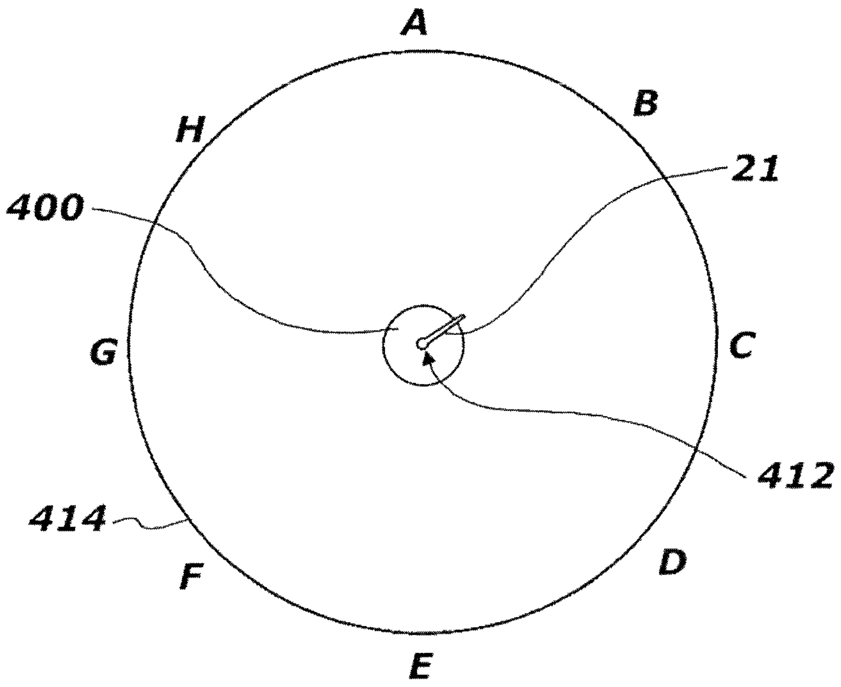
FIG. 15 is a top plan view of the fluid distribution area of a conventional, non-pressure-adjusting fluid dispenser in operative connection with an embodiment of a riser assembly.

The riser assembly 10 is configured to be used with a fluid dispenser such as a big riser sprinkler. This includes a conventional, non-pressure-adjusting fluid dispenser 21. With particular attention to FIG. 15, a riser assembly 400 with such a fluid dispenser has a control valve configured to expel fluid at an essentially-constant pressure as the dispenser pivots about a central pivot point 412, regardless of the dispenser's degree of pivoting. Therefore, typically, the distance at which the fluid will be maximally dispensed from the non-pressure-adjusting fluid dispenser 21 will be the same distance at an original position point, for example, point A in FIG. 15; as at point B once the dispenser 21 has pivoted 45 degrees from the original position point A; as at point C once the dispenser 21 has pivoted 90 degrees from point A; as a point D once the dispenser 21 has pivoted 135 degrees from point A; as a point E once the dispenser 21 has pivoted 180 degrees from point A; as a point F once the dispenser 21 has pivoted 225 degrees from point A; as a point G once the dispenser 21 has pivoted 270 degrees from point A; and as a point H once the dispenser 21 has pivoted 315 degrees from point A. Therefore, the resulting fluid distribution area 414 of the non-pressure-adjusting fluid dispenser 21 is substantially circular.

Figure 16:
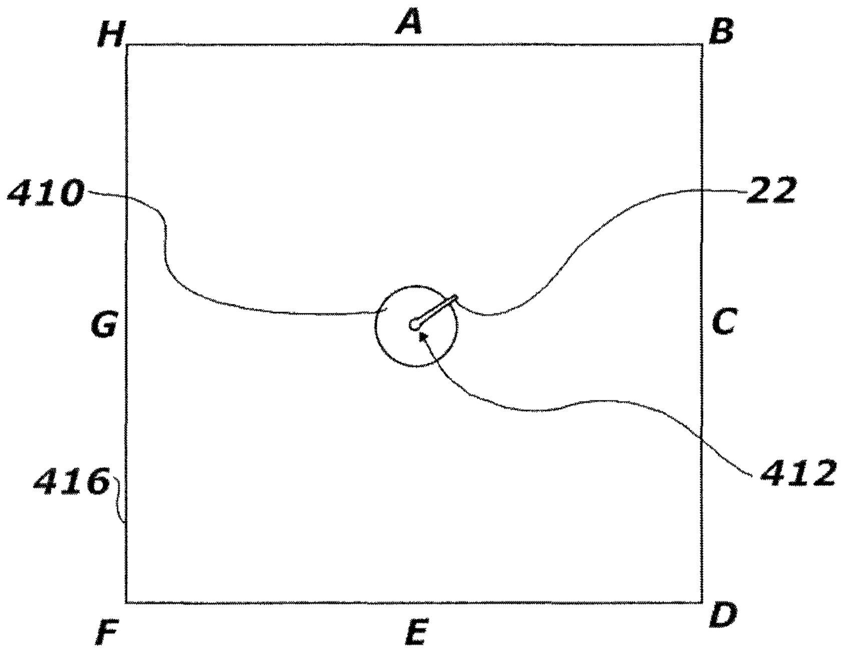
FIG. 16 is a top plan view of the fluid distribution area of a pressure-adjusting fluid dispenser in operative connection with an embodiment of a riser assembly.

With particular attention to FIG. 16, the riser assembly 10 is also configured to be used with a pressure-adjusting fluid dispenser 22 having a control valve configured to selectively adjust fluid pressure of fluid expelled through the dispenser 22 as the dispenser 22 pivots about a central pivot point 412. Preferably, the control valve of the pressure-adjusting fluid dispenser 22 is configured to be remotely programmed by an operator to set the appropriate fluid pressure at which to expel fluid based upon the dispenser's 22 present degree of pivoting from a predetermined original position point. According to the settings of the embodiment of a pressure-adjusting fluid dispenser 22 operatively connected to a riser assembly 10 shown in FIG. 16, the fluid pressure at which fluid is expelled by the dispenser 22 at original position point A is at a minimum and at a maximum at point B at which the dispenser 22 has pivoted 45 degrees from point A; again at a minimum at point C at which the dispenser 22 has pivoted 90 degrees from point A; again at a maximum at point D at which the dispenser 22 has pivoted 135 degrees from point A; again at a minimum at point E at which the dispenser 22 has pivoted 180 degrees from point A; again at a maximum at point F at which the dispenser 22 has pivoted 225 degrees from point A; again at a minimum at point G at which the dispenser 22 has pivoted 270 degrees from point A; again at a maximum at point H at which the dispenser 22 has pivoted 315 degrees from point A; and then again at a minimum upon returning to point A, 0 degrees from point A. The resulting fluid distribution area 416 is substantially square shaped. It should be understood that original position point A of FIG. 16 need not necessarily be the twelve-o'clock position. Further, in other embodiments, the control valve of the pressure-adjusting fluid dispenser 22 is alternatively programmed such that the fluid distribution area is shaped other than a square or circle.

The foregoing is considered as illustrative only of the principles of the riser assembly. Further, since modifications and changes will occur to those skilled in the art, it is not desired to limit the invention to the exact construction and operation shown and described, and, accordingly, all suitable modifications and equivalents may be resorted to, falling within the scope of the invention. The materials used in construction of the assembly include metallic elements, metallic alloys, and polymers that provide strength, durability, and rust resistance.

Thus, while there is shown and described the present preferred embodiments of the assembly, it is to be distinctly understood that this invention is not limited thereto but may be variously embodied to practice within the scope of the following claims. For example, while it is expected that the riser assembly will be particularly useful in in-ground installations such as in feedlots, in other embodiments, the riser assembly is useful in a readily-portable configurations, such as in being mounted to a vehicle having connection to a fluid supply tank or an extendable fluid conduit. Such embodiments would be suitable for use in dowsing wildfires in areas not conducive for the presence of firefighter personnel. Therefore, from the foregoing description, it will be apparent that various changes may be made without departing from the spirit and scope of the invention, as defined by the following claims.

What is claimed is:

1. A riser assembly for use with a sprinkler, the assembly comprising:

a container at least partially defining therein a reservoir configured to contain a pressurized fluid, the container further defining a fluid inlet opening to the reservoir and a fluid outlet opening from the reservoir, the fluid inlet, reservoir, and fluid outlet defining a fluid path through the container; and a conduit circumscribing a channel occupiable by a signal carrier, the conduit including:

an intermediate conduit portion passing at least partially internal to the fluid path in the reservoir, the intermediate conduit portion excluding the channel from the fluid path within the reservoir;

a first conduit portion operatively connected to the intermediate conduit portion and disposed through the container to a signal carrier entry area outside the container; and a second conduit portion operatively connected to the intermediate conduit portion and disposed through the container to a signal carrier exit area outside the container, the channel being configured to pass a signal carried by the single carrier from outside the container to a signal processor situatable outside the container, the signal processor being operatively connectable to a control valve operatively connectable to the sprinkler and configured to selectively control expulsion of fluid from the pressurized fluid through the sprinkler in response to the signal carried by the signal carrier and received by the signal processor.

2. The riser assembly of claim 1, wherein:

the first conduit portion is disposed through a side wall of the container to the signal carrier entry area outside the container; and the second conduit portion is disposed through a top of the container to the signal carrier exit area outside the container.

3. The riser assembly of claim 1, wherein:

the first conduit portion is disposed through a first extrusion disposed outwardly away from an outer surface of the container; and the second conduit portion is disposed through a second extrusion disposed upwardly away from an upper surface of the container.

4. The riser assembly of claim 1, wherein a secondary fluid outlet is disposed through the container, the secondary fluid outlet being operatively connectable with a secondary control valve configured to selectively control flow of the fluid from the pressurized fluid within the reservoir through the secondary fluid outlet.

5. The riser assembly of claim 4, wherein the secondary control valve comprises a ball valve subassembly operatively connected to the secondary fluid outlet.

6. The riser assembly of claim 1, wherein a secondary fluid outlet is disposed through the container, the secondary fluid outlet being operatively connected with a fluid drain valve.

7. The riser assembly of claim 1, wherein the container and the conduit comprise polyethylene and are configured to withstand at least 200 pounds of pressure per square inch.

8. The riser assembly of claim 1, wherein:

the sprinkler is configured to pivot about a central pivot point; and the control valve is further configured to selectively adjust fluid pressure of the fluid, from the pressurized fluid, expelled through the sprinkler as the sprinkler pivots about the central pivot point in dependence upon the sprinkler's degree of pivoting from a predetermined original position point.

9. A riser assembly for use with a sprinkler, the assembly comprising:

a container at least partially circumscribing a reservoir, the container defining a fluid inlet and a fluid outlet disposed through the container and in communication with the reservoir;

a cover connectable to the container, the cover having an aperture configured to contain a sprinkler supply line disposed therethrough, a cavity defined between the cover and the container, the fluid outlet defined by the container providing communication between the reservoir and a fluid outlet passageway extending at least partially through the cavity within the cover; and a conduit circumscribing a channel occupiable by a signal carrier in operable connection with a control valve operably connectable to the sprinkler, the conduit including:

an intermediate conduit portion passing through the reservoir, the intermediate conduit portion isolating the channel from the reservoir;

a first conduit portion operatively connected to the intermediate conduit portion and disposed through the container to a signal carrier entry area outside the container; and a second conduit portion operatively connected to the intermediate conduit portion and disposed through the container to a signal carrier exit area outside the container, the channel extending between the single carrier entry area outside the container and the signal carrier exit area outside the container.

10. The riser assembly of claim 9, wherein:

the signal carrier exit area is within the cavity; and the signal carrier is disposable through the channel to carry a signal from outside the container through the channel for processing within the cavity.

11. The riser assembly of claim 9, wherein:

the first conduit portion is disposed through a side wall of the container to the signal carrier entry area outside the container;

the second conduit portion is disposed through a top of the container to the signal carrier exit area outside the container; and the signal carrier is disposable through the channel to carry the signal from outside the container through the channel to the signal processor.

12. The riser assembly of claim 9, wherein:

the first conduit portion is disposed through a first extrusion disposed outwardly away from an outer surface of the container; and the second conduit portion is disposed through a second extrusion disposed upwardly away from an upper surface of the container.

13. The riser assembly of claim 9, wherein the cover has disposed therethrough an opening coverable by a door selectively securable to the cover by a lock.

14. The riser assembly of claim 9, wherein a secondary fluid outlet is disposed through the container, the secondary fluid outlet being operatively connectable with a secondary control valve configured to selectively control flow of fluid from the reservoir through the secondary fluid outlet.

15. The riser assembly of claim 9, further comprising:

a secondary fluid outlet communicating through a sidewall of the container; and a ball valve subassembly operatively connected to the secondary fluid outlet.

16. The riser assembly of claim 9, further comprising a fluid drain valve operatively connected to a secondary fluid outlet disposed through the container.

17. The riser assembly of claim 9, wherein the container and the conduit comprise polyethylene.

18. The riser assembly of claim 9, wherein:

the reservoir is partially filled with a pressurized fluid;

the sprinkler is configured to pivot about a central pivot point; and the control valve is further configured to selectively adjust fluid pressure of fluid, from the pressurized fluid, expelled through the sprinkler as the sprinkler pivots about the central pivot point in dependence upon the sprinkler's degree of pivoting from a predetermined original position point.

19. The riser assembly of claim 9, wherein:

the cover defines a lower cover edge; and the container comprises an upper container surface defining therein a groove configured to snugly receive therein the lower cover edge such that the aperture in the cover aligns with the fluid outlet.

20. A riser assembly for use with a fluid dispenser, the assembly comprising:

a reservoir configured to contain a pressurized fluid;

a container partially circumscribing the reservoir, the container having a fluid inlet and a primary fluid outlet disposed through the container;

a secondary fluid outlet disposed through the container, the secondary fluid outlet being operatively connectable with a secondary control valve configured to selectively control flow of the fluid from the reservoir through the secondary fluid outlet; and an upper container surface, the upper container surface defining therein a groove;

a cover connectable to the container, the cover having a cover lower edge, the cover lower edge being configured to be snugly received within the groove; and an aperture for containing a fluid dispenser supply line disposed therethrough, a cavity being formed between the cover and the container; and a signal processor situatable outside the container, the signal processor being configured to receive a signal and the signal processor being operatively connectable to a primary control valve operatively connectable to the fluid dispenser, the primary control valve being configured to selectively control expulsion of the fluid through the fluid dispenser in response to the signal received by the signal processor.

* * * * *